United States Patent
Lu (10) Patent No.: US 11,115,143 B2
(45) Date of Patent: Sep. 7, 2021

(54) ELECTRONIC APPARATUS WITH DATA TRANSCEIVING MECHANISM AND DATA TRANSCEIVING METHOD

(71) Applicant: Realtek Semiconductor Corp., HsinChu (TW)

(72) Inventor: Yen-Ju Lu, Hsinchu (TW)

(73) Assignee: Realtek Semiconductor Corp., HsinChu (TW)

(*) Notice: Subject to any disclaimer, the term of this patent is extended or adjusted under 35 U.S.C. 154(b) by 57 days.

(21) Appl. No.: 16/695,060

(22) Filed: Nov. 25, 2019

(65) Prior Publication Data

US 2020/0374022 A1 Nov. 26, 2020

(30) Foreign Application Priority Data

May 24, 2019 (TW) .................................. 108118103

(51) Int. Cl.
*H04J 3/14* (2006.01)
*H04B 1/40* (2015.01)

(52) U.S. Cl.
CPC . *H04J 3/14* (2013.01); *H04B 1/40* (2013.01)

(58) Field of Classification Search
CPC ......... H04B 1/66; G06F 13/124; G06F 13/18; G06F 16/58
See application file for complete search history.

(56) References Cited

U.S. PATENT DOCUMENTS

| 4,837,800 A | * | 6/1989 | Freeburg | H04W 88/02 455/557 |
| 6,311,288 B1 | * | 10/2001 | Heeren | H04B 1/74 370/217 |
| 6,496,890 B1 | | 12/2002 | Azevedo | |
| 6,760,766 B1 | | 7/2004 | Sahlqvist | |
| 9,306,985 B1 | * | 4/2016 | Liu | H04L 65/40 |
| 10,282,507 B2 | * | 5/2019 | Saraswat | G06F 30/20 |
| 2003/0005043 A1 | | 1/2003 | Hsu | |

FOREIGN PATENT DOCUMENTS

| CN | 101645057 | 2/2010 |
| TW | 518458 | 1/2003 |

* cited by examiner

*Primary Examiner* — Chandrahas B Patel
(74) *Attorney, Agent, or Firm* — Winston Hsu (57) ABSTRACT

An electronic apparatus with a data transceiving mechanism includes: a processing circuit, configured to generate a data request; a transceiving apparatus, coupled to the processing circuit, configured to transmit the data request to at least one target electronic apparatus; and a monitoring circuit, coupled to the processing circuit and the transceiving apparatus, configured to calculate data related parameters for the data transmitted by or received by the transceiving apparatus in a predetermined time period after the transceiving apparatus transmits or receives the data request. If the data related parameter does not match a predetermined rule, the monitoring circuit substitutes the processing circuit to complete a data transaction and to generate an inform message to the processing circuit.

20 Claims, 8 Drawing Sheets

FIG. 8

ELECTRONIC APPARATUS WITH DATA TRANSCEIVING MECHANISM AND DATA TRANSCEIVING METHOD

BACKGROUND OF THE INVENTION

1. Field of the Invention

The present invention relates to an electronic apparatus with a data transceiving mechanism and an associated data transceiving method, and more particularly, to an electronic apparatus with a data transceiving mechanism and a data transceiving method capable of preventing crash incidents.

2. Description of the Prior Art

Figure 1:
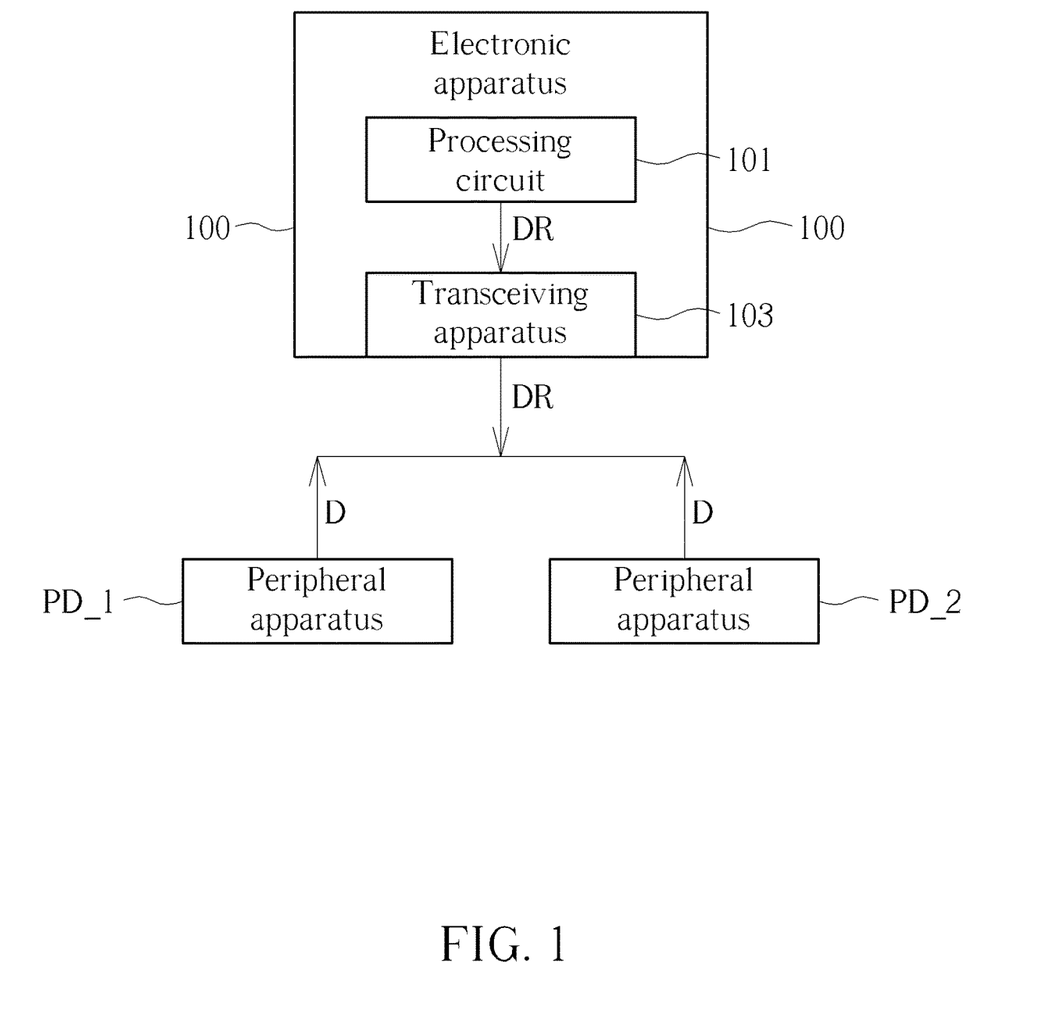
FIG. 1 is a block diagram illustrating an electronic apparatus and peripheral apparatus according to a related art technique.

In related art techniques, the electronic apparatus generally comprises a processing circuit and a transceiving apparatus to receive data from peripheral apparatuses. FIG. 1 is a block diagram illustrating an electronic apparatus and peripheral apparatus according to a related art technique. As shown in FIG. 1, the electronic apparatus 100 comprises a processing circuit 101 and a transceiving apparatus 103. When there is a need to obtain data, the processing circuit 101 will transmit the data request DR and the transmit data request DR to the peripheral apparatus PD_1 or the peripheral apparatus PD_2 via the transceiving apparatus 103. Next, the peripheral apparatus PD_1 or the peripheral apparatus PD_2 will utilize the transceiving apparatus 103 to transmit the data D to the processing circuit 101 in response to the data request DR.

In some circumstances, however, the above process may not be smoothly completed. For example, the data request DR may not be successfully transmitted to the peripheral apparatus PD_1 or PD_2 due to some issues in the transmission path or the transceiving apparatus 103. In another example, the data D may not be successfully transmitted to the processing circuit 101 due to some issues in the transmission path or the transceiving apparatus 103. In this way, the processing circuit 101 generally aborts other pending tasks and only waits for the data D, resulting in some crash incidents. Once the processing circuit 101 is in the crash state, it cannot eliminate problems.

Therefore, there is a need for a novel data transmission method to solve the aforementioned problem.

SUMMARY OF THE INVENTION

Hence, an objective of the present invention is to provide an electronic apparatus with a data transceiving mechanism, which may prevent the crash state mentioned in related arts from happening.

Another objective of the present invention is to provide a data transceiving method which may prevent the crash state mentioned in related arts.

An embodiment of the present invention proposes an electronic apparatus with a data transceiving mechanism that comprises a processing circuit, a transceiving apparatus and a monitoring circuit. The processing circuit is configured to generate a data request. The transceiving apparatus is coupled to the processing circuit, and is configured to transmit the data request to at least one target electronic apparatus. The monitoring circuit is coupled to the processing circuit and the transceiving apparatus, and is configured to calculate data-related parameters for data transmitted/received by the transceiving apparatus within a predetermined time period after the transceiving apparatus transmits/ receives the data request. If the data-related parameter does not match a predetermined rule, the monitoring circuit substitutes the processing circuit to complete data transaction corresponding to the data request and to generate notification message to the processing circuit; and if the data-related parameter matches the predetermined rule, the monitoring circuit does not substitute the processing circuit to complete the data transaction corresponding to the data request and to generate the notification message.

Another embodiment of the present invention proposes a data transceiving method applied to an electronic apparatus that comprises a processing circuit and a transceiving apparatus. The data transceiving method comprises: (a) generating a data request with the processing circuit; (b) the transceiving apparatus transmitting the data request to at least one target electronic apparatus; and (c) calculating data-related parameters for the data transmitted/received by the transceiving apparatus within a predetermined time period after the transceiving apparatus transmits/receives the data request; wherein if the data-related parameter does not match a predetermined rule, a monitoring circuit is configured to substitute the processing circuit to complete data transaction corresponding to the data request and to generate notification message to the processing circuit; and if the data-related parameter matches the predetermined rule, the monitoring circuit does not substitute the processing circuit to complete data transaction corresponding to the data request and to generate notification message to the processing circuit.

The aforementioned embodiments may prevent the crash incidents faced in related art techniques due to the processing circuit not receiving data. Further, the scope of the present invention is applicable to all kinds of circumstances, and shall not be limited to solve the above problem only.

These and other objectives of the present invention will no doubt become obvious to those of ordinary skill in the art after reading the following detailed description of the preferred embodiment that is illustrated in the various figures and drawings.

DETAILED DESCRIPTION

Elements in the following embodiments may be implemented with hardware (e.g. an apparatus or circuit) or firmware (e.g. at least one program executed by a processor) approaches. In addition, the elements in the embodiments may be divided into more sub-elements, or be integrated into fewer main elements.

Figure 2:
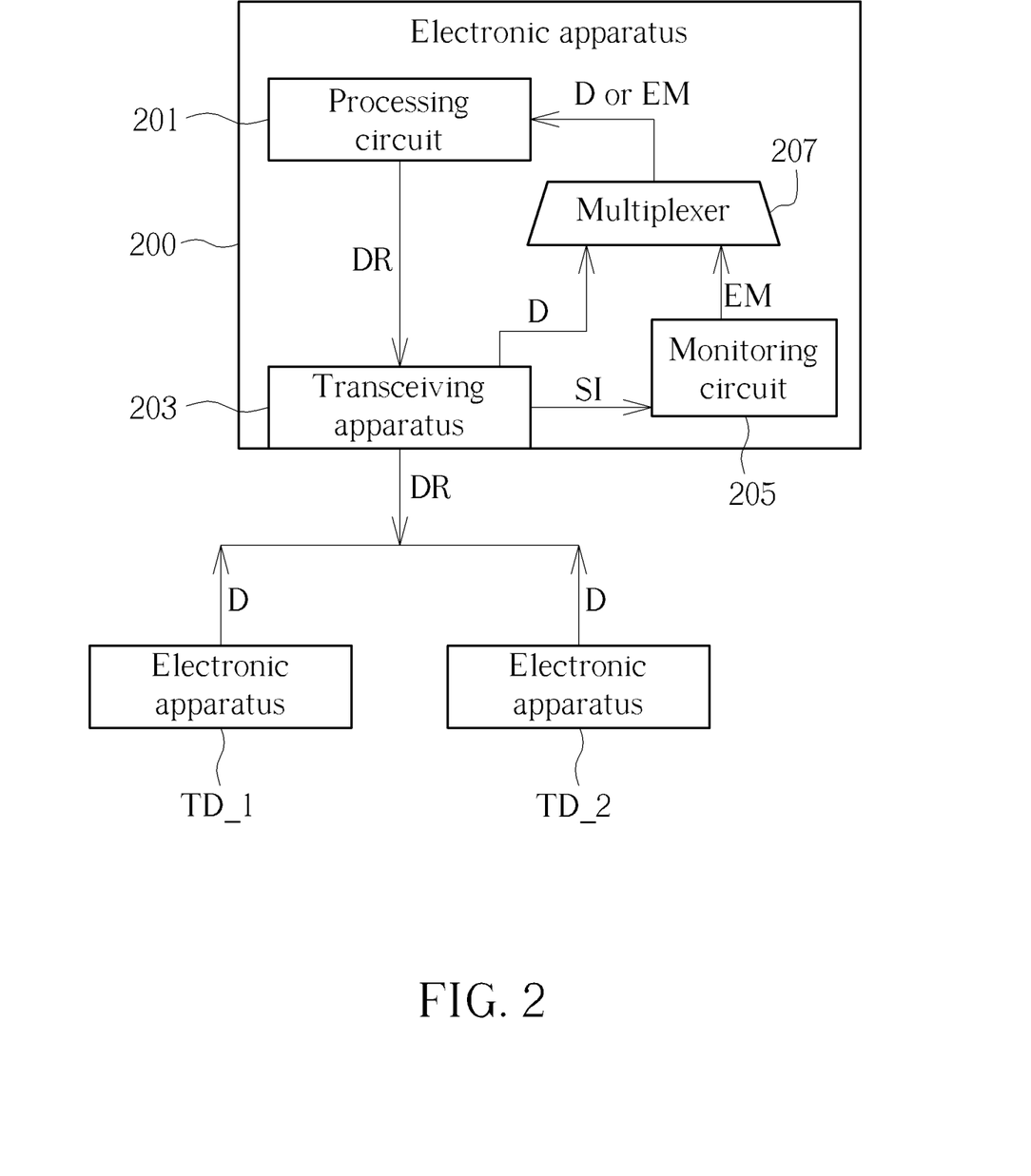
FIG. 2 is a block diagram illustrating an electronic apparatus according to an embodiment of the present invention.

FIG. 2 is a block diagram illustrating an electronic apparatus according to an embodiment of the present invention. As shown in FIG. 2, the electronic apparatus 200 comprises a processing circuit 201, a transceiving apparatus 203, a monitoring circuit 205 and a multiplexer 207. The processing circuit 201 is configured to generate a data request DR. The transceiving apparatus 203 is coupled to the processing circuit 201, and is configured to transmit data request DR to at least one target electronic apparatuses TD_1, TD_2 . . . (although this embodiment only depicts two target electronic apparatuses, but the present invention does not limit the number of target electronic apparatuses). The monitoring circuit 205 is coupled to the processing circuit 201 and the transceiving apparatus 203, and is configured to calculate data-related parameters for the data transmitted or received by the transceiving apparatus 203 within a predetermined time period after the transceiving apparatus 203 transmits or receives the data request DR. If the data-related parameters do not match a predetermined rule, the monitoring circuit 205 will substitute the processing circuit 201 to complete a data transaction corresponding to the data request DR and transmit a notification message EM to the processing circuit 201. If the data-related parameters do not match the predetermined rule, the processing circuit 201 will neither substitute to complete the data transaction corresponding to the data request DR, nor generate the notification message EM that is used to inform the monitoring circuit 205 so that the processing circuit 201 may still complete the data transaction corresponding to the data request DR despite not receiving the expected the data D within the predetermined time period. Hence, the processing circuit 201 may proceed the next task without having received the data D, and therefore the crash incident in the related art technique due to keeping waiting the data D can be prevented.

The aforementioned approach allows the monitoring circuit 205 to substitute the processing circuit 201 to complete the data transaction corresponding to the data request DR may be implemented in many ways. For example, the monitoring circuit 205 may transmit alternative data to the processing circuit 201 to replace the data D, and may send a notification message EM to inform the processing circuit 201 of the occurrence of this situation. In another example, the notification message EM for notifying that the processing circuit 201 has received the data D can be directly transmitted (even when the data in fact is not received). In this way, the processing circuit 201 is allowed to complete data transaction corresponding to the data request DR. After receiving the notification message EM, the processing circuit 201 may either perform a reset operation or directly execute the next task based on actual needs.

The receiving terminal of the multiplexer 207 comprises a first path and a second path. The transceiving apparatus 203 transmits the data D to the processing circuit 201 via the first path, and the monitoring circuit 205 transmits the notification message EM to the processing circuit 201 via the second path. In an embodiment, the multiplexer 207 can be omitted, and thus the transceiving apparatus 203 and the monitoring circuit 205 will be coupled to the processing circuit 201, respectively. The processing circuit 201 and the monitoring circuit 205 are two independent circuits. When the processing circuit 201 fails to be operated (e.g. the crash has occurred), the monitoring circuit 205 may still normally execute the functions thereof. However, the monitoring circuit 205 may also be integrated into other apparatuses or circuits. In an embodiment, when the processing circuit 201 receives the notification message EM, the processing circuit 201 will reset the transceiving apparatus 203. The term "reset" here may simply mean deleting the data in the transceiving apparatus 203 that is currently transmitted, or may mean turning off the transceiving apparatus 203 and then turning it on again.

Figure 3A:
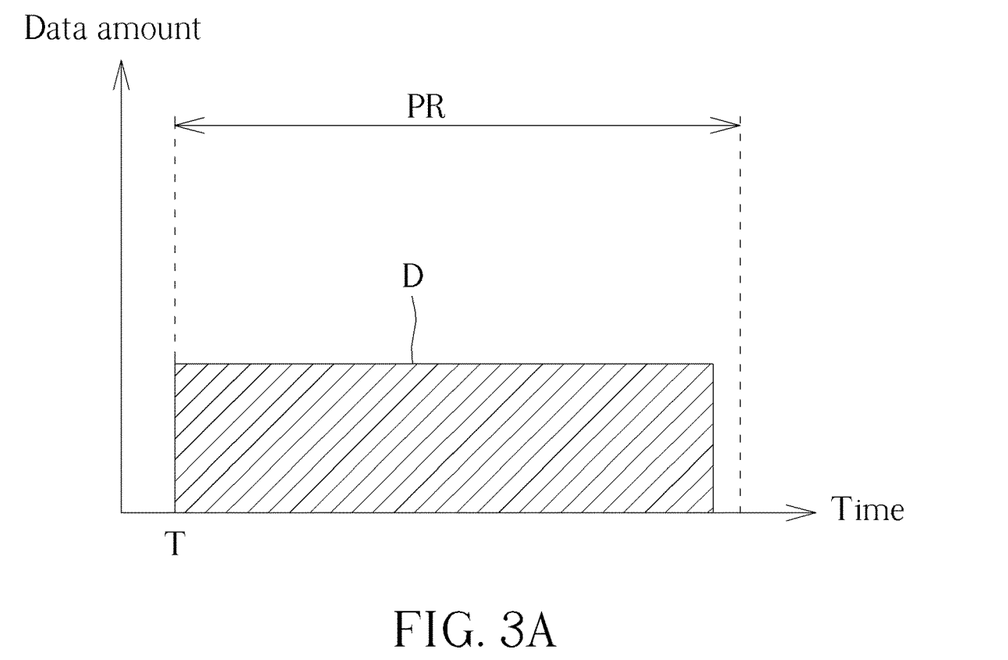
FIG. 3A and FIG. 3B are diagrams illustrating a monitoring circuit according to an embodiment of the present invention.
Figure 3B:
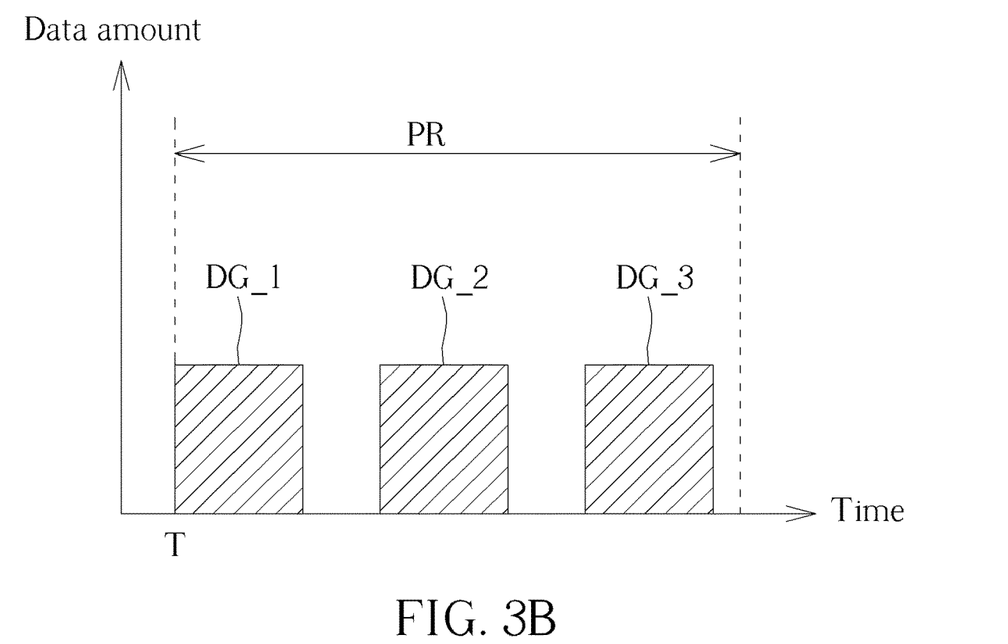

In an embodiment, the aforementioned data-related parameter is the data amount of the data D, and the aforementioned predetermined rule defines the data amount be larger than a threshold value (which can be any integer equal or larger than 0). When the threshold value is 0, that means as long as there is data still being transmitted or received by the transceiving apparatus 203, the monitoring circuit 205 will not substitute the processing circuit 201 to complete the data transaction or transmit the notification message EM. While in another embodiment, the aforementioned data-related parameter can be the number of data groups, and the predetermined rule may require the number of data groups be larger than a threshold value (which can be any integer equal or larger than 0). When the threshold value is 0, it means as long as there is data still being transmitted or received by the transceiving apparatus 203, the monitoring circuit 205 will not substitute the processing circuit 201 to complete the data transaction or transmit the notification message EM. FIG. 3A and FIG. 3B are diagrams illustrating a monitoring circuit according to an embodiment of the present invention. As shown in FIG. 3A, the transceiving apparatus 203 transmits or receives the data request DR at the timing T, and in the predetermined time period PR, the monitoring circuit 205 calculates whether the data amount of the data D transmitted or received by the transceiving apparatus 203 is larger than the threshold value in order to determine whether to substitute the processing circuit 201 to complete data transaction and transmit the notification message EM. In the embodiment of FIG. 3A, the data transmission rate (e.g. mb/sec) can be predefined, and therefore the monitoring circuit 205 may calculate the data amount of the data D transmitted or received by the transceiving apparatus 203 according to the transmission time and transmission rate of the data. Further, as shown in FIG. 3B, the transceiving apparatus 203 transmits or receives the data request DR at the time point T, and in the predetermined time period PR, the monitoring circuit 205 calculates whether the number of the data groups DG 1, DG 2, DG 3 (the number is 3 in this example) transmitted or received by the transceiving apparatus 203 is larger than a threshold value, in order to determine whether to substitute the processing circuit 201 to complete data transaction and transmit the notification message EM.

In an embodiment, the processing circuit 201 may be implemented by using a processor to execute at least one program. In another embodiment, the transceiving apparatus 203 comprises a logic circuit, and the monitoring circuit 205 comprises a timer. When receiving data or transmit data, the transceiving apparatus 203 will transmit indication signal SI to the monitoring circuit 205 to notify that the data has been received or transmitted. Otherwise, when the transceiving apparatus 203 does not receive or transmit data, the indication signal SI will not be transmitted to the monitoring circuit 205. Hence, the monitoring circuit 205 may calculate the frequency the transceiving apparatus 203 receives or transmits data (which is corresponding to the number of the data group), or the data amount of received/transmitted data.

Figure 4:
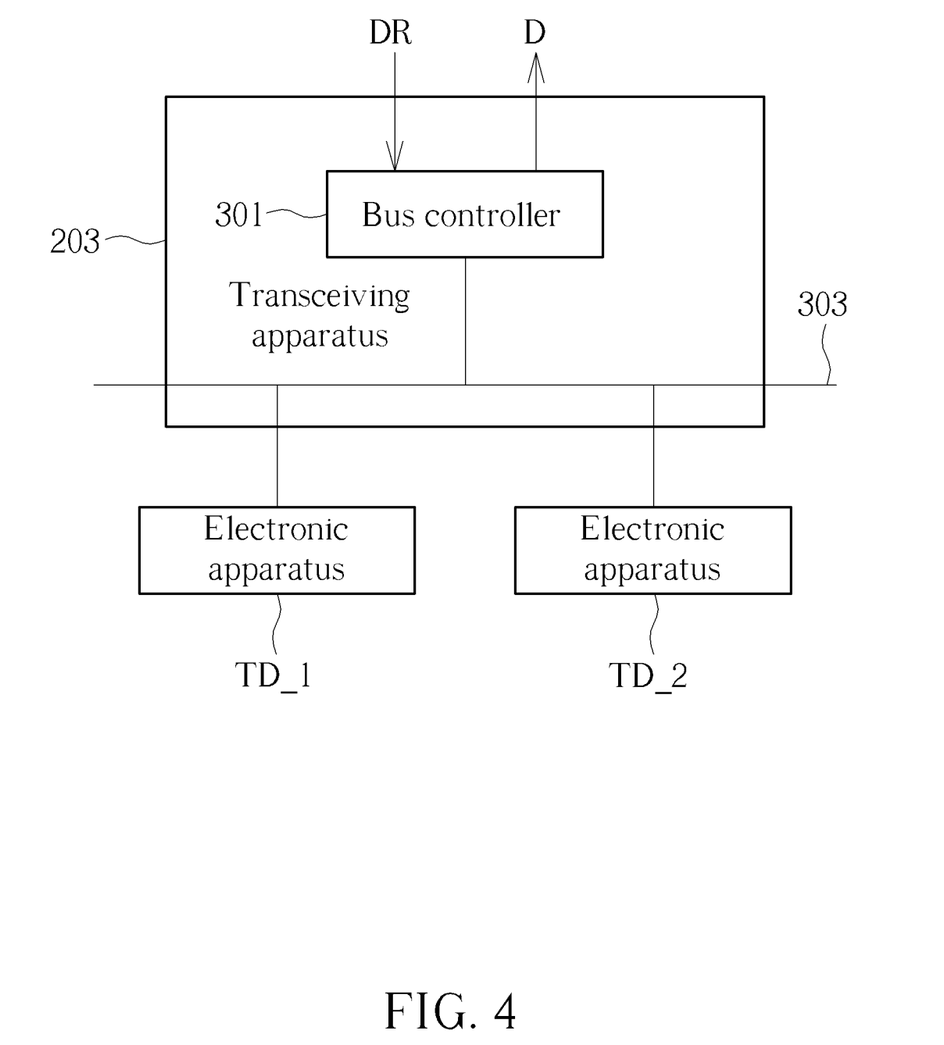
FIG. 4 is a diagram illustrating a transceiving apparatus according to an embodiment of the present invention.

The transceiving apparatus 203 may be any kind of transceiving apparatus. FIG. 4 is a diagram illustrating a transceiving apparatus 203 according to an embodiment of the present invention. In the embodiment of FIG. 4, the transceiving apparatus 203 comprises a bus controller 301 and a bus 303. The bus controller 301 is configured to receive the data request DR and output the data D. The target electronic apparatuses TD_1, TD_2 may be coupled to bus controller 301 via the bus 303.

Figure 5:
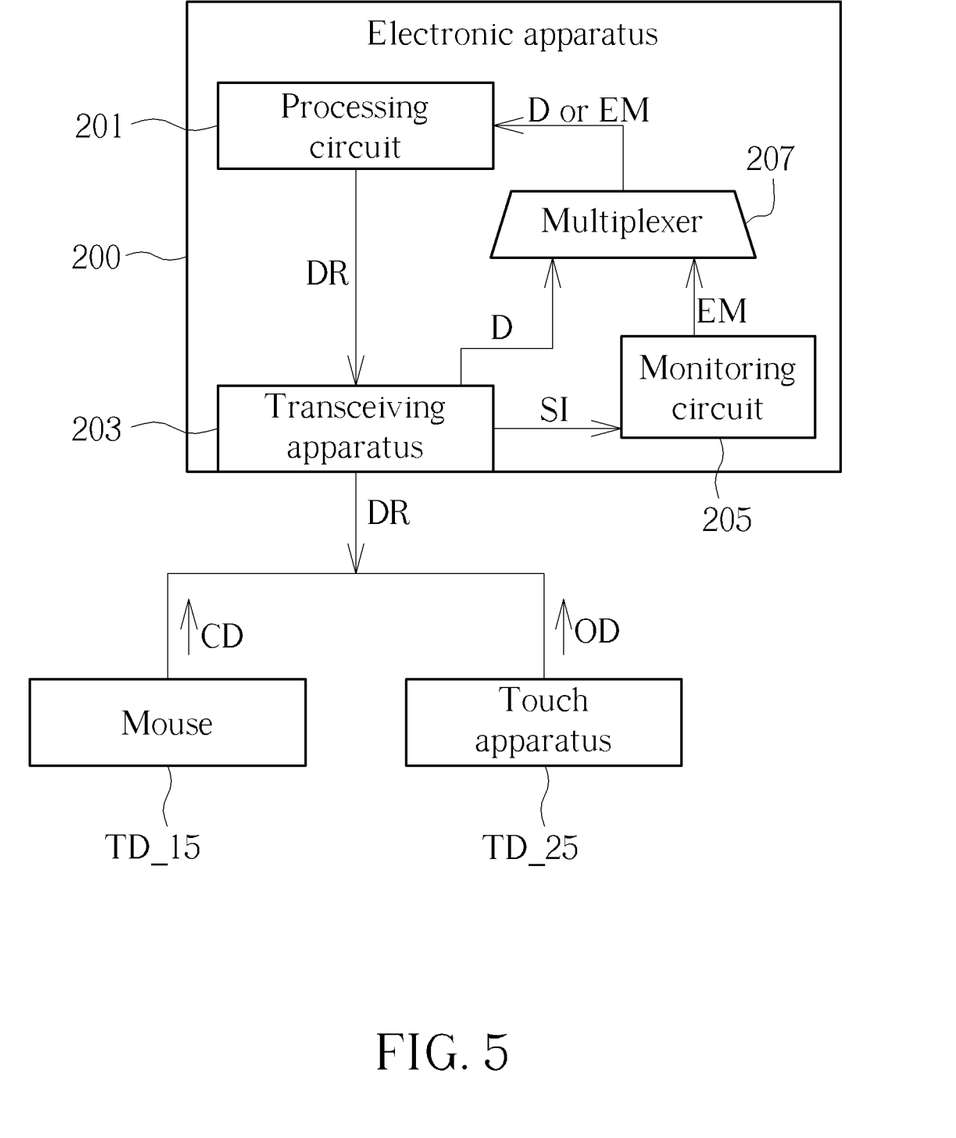
FIG. 5 to FIG. 7 are block diagrams illustrating target electronic apparatuses according to difference embodiments of the present invention, respectively.
Figure 6:
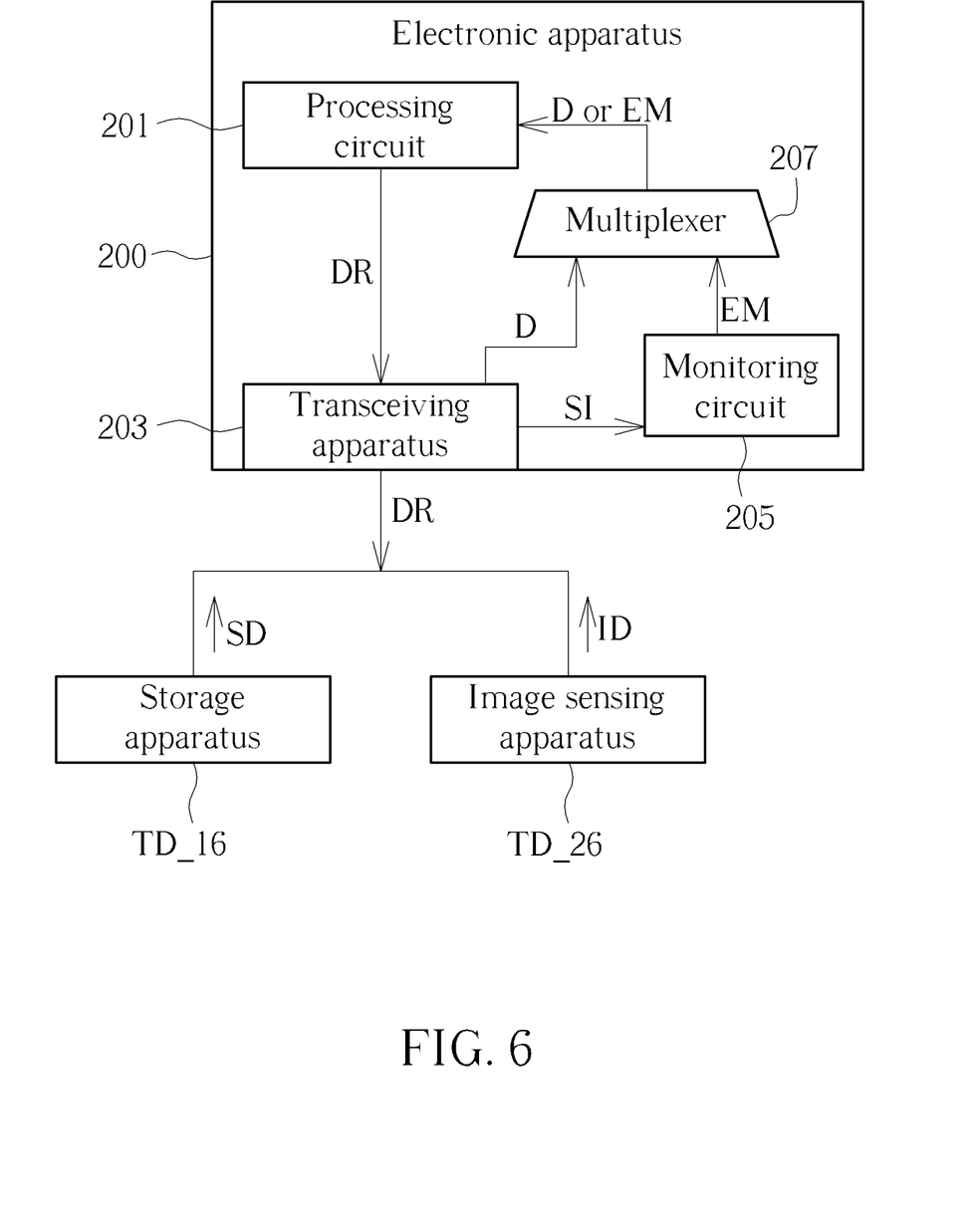
Figure 7:
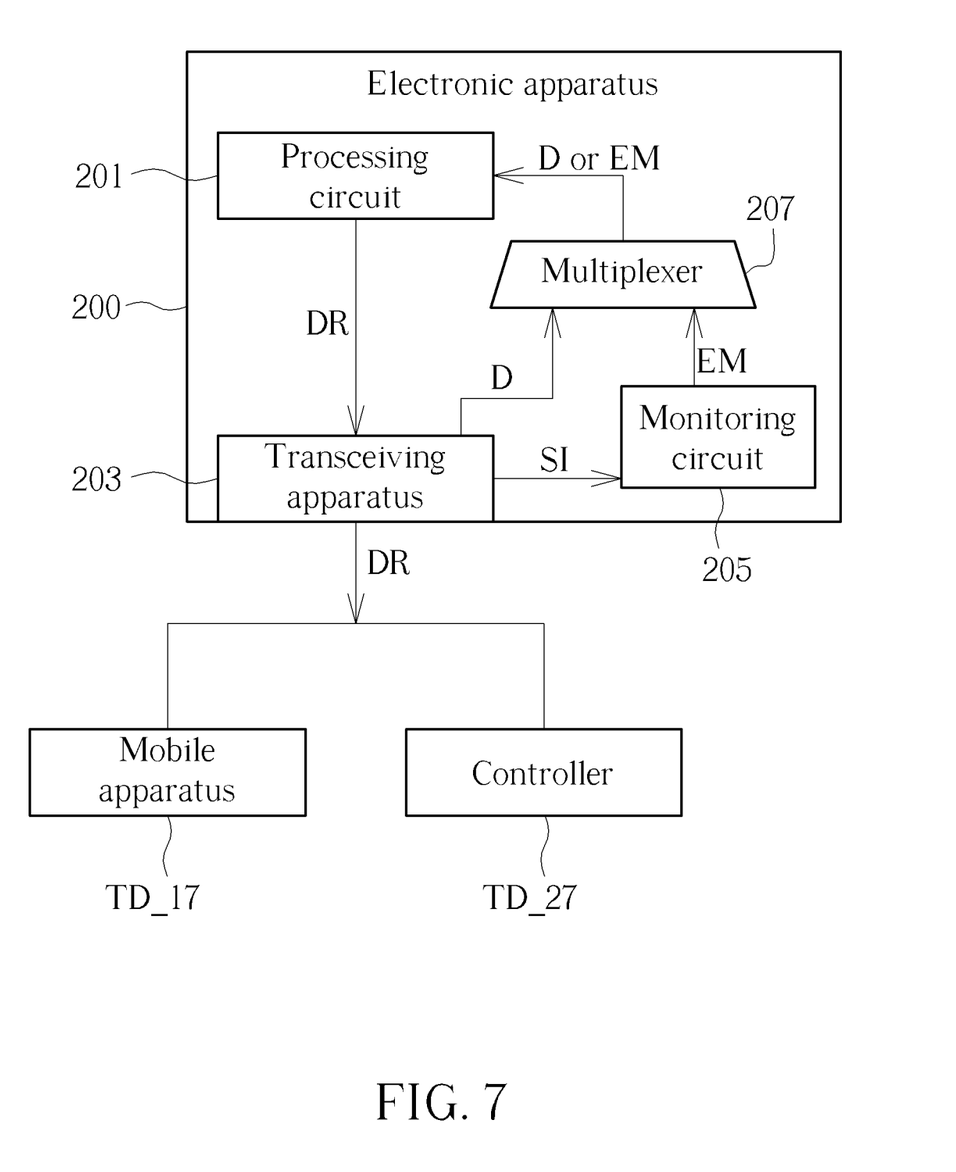

The aforementioned target electronic apparatuses TD_1, TD_2 may be any kind of electronic apparatus. FIG. 5 to FIG. 7 are block diagrams illustrating target electronic apparatuses according to difference embodiments of the present invention, respectively. In the embodiment of FIG. 5, the target electronic apparatus is located in an external apparatus outside the electronic apparatus 200. For example, the target electronic apparatuses in FIG. 5 include the mouse TD 15 and the touch apparatus TD 25 (e.g. a touch panel). The mouse TD 15 may output the coordinate data CD in response to the data request DR, and the touch apparatus TD 25 may output the touch data OD in response to the data request DR. The electronic apparatus 200 may be coupled to the mouse TD 15 or the touch apparatus TD 25 in a wired or wireless manner.

In the embodiment of FIG. 6, the target electronic apparatus is located in an internal apparatus of the electronic apparatus 200. For example, the target electronic apparatuses shown in FIG. 6 include a storage apparatus TD 16 and an image sensing apparatus TD 26. Said storage apparatus may be a main memory (such as RAM or ROM), the hard disk drive in the electronic apparatus, or a memory in a chip. The image sensing apparatus TD 26 may be configured to sense images, which is similar to an image sensor in an image camera. The storage apparatus TD 16 outputs the data SD stored therein in response to the data request, and the image sensing apparatus TD 26 outputs the image data ID in response to the data request DR.

In the embodiment of FIG. 7, the target electronic apparatus is independent form the electronic apparatus 200. That is, the target electronic apparatus has at least one dedicated function, so that the target electronic apparatus can be operated independently without connecting to the electronic apparatus 200. For example, the target electronic apparatuses in FIG. 7 may be a mobile apparatus TD 17 (e.g. smartphone or tablet) and controller TD 27. The electronic apparatus 200 may be coupled to the mobile apparatus TD 17 or the controller TD 27 in a wired or wireless manner.

Figure 8:
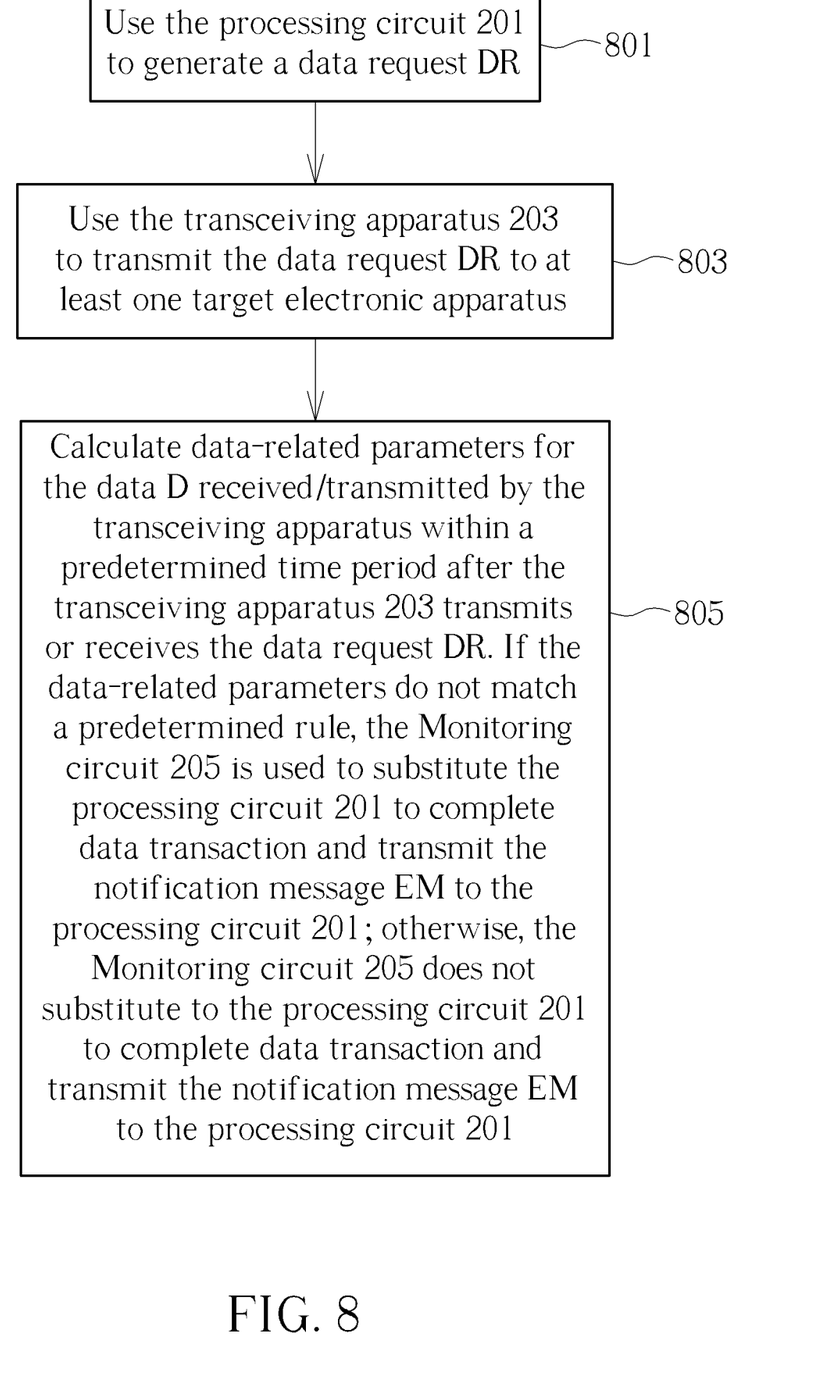
FIG. 8 is a flowchart illustrating a data transmission method.

FIG. 8 is a flowchart illustrating a data transmission method. The data transceiving method can be concluded from the above embodiments, and can be applied to an electronic apparatus that comprises a processing circuit and a transceiving apparatus (e.g. the electronic apparatus 200 shown in FIG. 2). The detailed descriptions of the steps in FIG. 8 are as follows.

Step 801:

Use the processing circuit 201 to generate a data request DR.

Step 803:

Use the transceiving apparatus 203 to transmit the data request DR to at least one target electronic apparatus.

Step 805:

Calculate data-related parameters for the data D received or transmitted by the transceiving apparatus within a predetermined time period after the transceiving apparatus 203 transmits or receives the data request DR. If the data-related parameters do not match a predetermined rule, the monitoring circuit 205 is used to substitute the processing circuit 201 to complete data transaction and transmit the notification message EM to the processing circuit 201. If the data-related parameters match the predetermined rule, the monitoring circuit 205 does not substitute to the processing circuit 201 to complete data transaction and transmit the notification message EM to the processing circuit 201.

The aforementioned embodiments may prevent the crash incidents faced in related art techniques due to the processing circuit not receiving data. Further, the scope of the present invention is applicable to all kinds of circumstances, and shall not be limited to solve the above problem only.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus with a data transceiving mechanism, comprising:
   a processing circuit, configured to generate a data request;
   a transceiving apparatus, coupled to the processing circuit, the transceiving apparatus configured to transmit the data request to at least one target electronic apparatus, wherein the data request is for requesting the target electronic apparatus to generate data corresponding to the data request; and
   a monitoring circuit, coupled to the processing circuit and the transceiving apparatus, the monitoring circuit configured to calculate data-related parameters for the data received by the transceiving apparatus within a predetermined time period after the transceiving apparatus transmits the data request;
   wherein if the data-related parameter does not match a predetermined rule, the monitoring circuit substitutes the processing circuit to complete data transaction corresponding to the data request and to generate notification message to the processing circuit; and if the data-related parameter matches the predetermined rule, the monitoring circuit does not substitute the processing circuit to complete the data transaction corresponding to the data request and to generate the notification message.

2. The electronic apparatus of claim 1, wherein the data-related parameter is the data amount of the data, and the predetermined rule defines the data amount be larger than a threshold value.

3. The electronic apparatus of claim 2, wherein the threshold value is 0.

4. The electronic apparatus of claim 1, wherein the data-related parameter is data group number of the data, and the predetermined rule defines the number of the data group number be larger than a threshold value.

5. The electronic apparatus of claim 4, wherein the threshold value is 0.

6. The electronic apparatus of claim 1, further comprising:
   a multiplexer, coupled to the transceiving apparatus and the monitoring circuit, the multiplexer comprising a first path and a second path, wherein the transceiving apparatus transmits the data to the processing circuit via the first path, and the monitoring circuit transmits the notification message to the processing circuit via the second path.

7. The electronic apparatus of claim 1, wherein when the processing circuit receives the notification message, the processing circuit directly executes a next operation.

8. The electronic apparatus of claim 1, wherein when the processing circuit receives the notification message, the processing circuit resets the transceiving apparatus.

9. The electronic apparatus of claim 1, wherein the target electronic apparatus is located in an internal apparatus of the electronic apparatus.

10. The electronic apparatus of claim 1, wherein when the processing circuit cannot be operated, the monitoring circuit is still able to be normally operated.

11. A data transceiving method, applied to an electronic apparatus that comprises a processing circuit and a transceiving apparatus, the data transceiving method comprising:
   (a) generating a data request with the processing circuit;
   (b) the transceiving apparatus transmitting the data request to at least one target electronic apparatus, wherein the data request is for requesting the target electronic apparatus to generate data corresponding to the data request; and
   (c) calculating data-related parameters for the data received by the transceiving apparatus within a predetermined time period after the transceiving apparatus transmits the data request; wherein if the data-related parameter does not match a predetermined rule, a monitoring circuit is configured to substitute the processing circuit to complete data transaction corresponding to the data request and to generate notification message to the processing circuit; and if the data-related parameter matches the predetermined rule, the monitoring circuit does not substitute the processing circuit to complete data transaction corresponding to the data request and to generate notification message to the processing circuit.

12. The data transceiving method of claim 11, wherein the data-related parameter is the data amount of the data, and the predetermined rule defines the data amount be larger than a threshold value.

13. The data transceiving method of claim 12, the threshold value is 0.

14. The data transceiving method of claim 11, wherein the data-related parameter is the data group number of the data, and the predetermined rule defines the number of the data group number be larger than a threshold value.

15. The data transceiving method of claim 14, wherein the threshold value is 0.

16. The data transceiving method of claim 11, wherein the electronic apparatus further comprises a multiplexer coupled to the transceiving apparatus and the monitoring circuit, the multiplexer comprises a first path and a second path, and the data transceiving method further comprises:
   utilizing the transceiving apparatus to transmit the data to the processing circuit via the first path, and utilizing the monitoring circuit to transmit the notification message to the processing circuit via the second path.

17. The data transceiving method of claim 11, further comprising:
   when the processing circuit receives the notification message, making the processing circuit directly executes a next operation.

18. The data transceiving method of claim 11, further comprising:
   when the processing circuit receives the notification message, making the processing circuit reset the transceiving apparatus.

19. The data transceiving method of claim 11, wherein the target electronic apparatus is located in an internal apparatus in the electronic apparatus.

20. The data transceiving method of claim 11, wherein the electronic apparatus further comprises a monitoring circuit, configured to execute the Step (c); and when the processing circuit cannot be operated, the monitoring circuit is still able to be normally operated.

\* \* \* \* \*